United States Patent
Mei et al.

(10) Patent No.: US 11,075,942 B2
(45) Date of Patent: Jul. 27, 2021

(54) IDENTITY VERIFICATION AND ACCOUNT INFORMATION UPDATING METHODS AND APPARATUSES

(71) Applicant: Advanced New Technologies Co., Ltd., Grand Cayman (KY)

(72) Inventors: Jue Mei, Hangzhou (CN); Ting Liang, Hangzhou (CN); Biao Fan, Hangzhou (CN); Xin Chen, Hangzhou (CN); Yang Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/084,605

(22) Filed: Oct. 29, 2020

(65) Prior Publication Data
US 2021/0051168 A1    Feb. 18, 2021

Related U.S. Application Data

(63) Continuation of application No. PCT/CN2019/094848, filed on Jul. 5, 2019.

(30) Foreign Application Priority Data

Jul. 27, 2018 (CN) .......................... 201810845003.3

(51) Int. Cl.
*H04L 29/00* (2006.01)
*H04L 29/06* (2006.01)
*H04L 29/08* (2006.01)

(52) U.S. Cl.
CPC ...... *H04L 63/1433* (2013.01); *H04L 63/0861* (2013.01); *H04L 67/306* (2013.01)

(58) Field of Classification Search
CPC ............. H04L 63/1433; H04L 63/0861; H04L 67/306
See application file for complete search history.

(56) References Cited

U.S. PATENT DOCUMENTS 8,756,661 B2 * 6/2014 Levenberg .......... H04L 63/0807
726/4
9,426,139 B1    8/2016 McClintock et al.
(Continued)

FOREIGN PATENT DOCUMENTS

CN    101447872    6/2009
CN    102761531    10/2012
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Don G Zhao
(74) *Attorney, Agent, or Firm* — Fish & Richardson P.C.

(57) ABSTRACT

The present specification provides identity verification and account information updating methods and apparatuses. One method comprises: in response to receiving a request for updating an account, obtaining personal information and information of a network environment associated with an operator of the account; performing risk identification of the personal information to obtain a first risk identification result; performing risk identification of the information of the network environment to obtain a second risk identification result, wherein the second risk identification result identifies security risks associated with the network environment the operator operates in; selecting an identity verification method based on the first risk identification result and the second risk identification result; and performing identity verification of the operator based on the identity verification method.

24 Claims, 8 Drawing Sheets

(56) References Cited

U.S. PATENT DOCUMENTS

| | | | | |
|---|---|---|---|---|
| 10,181,032 | B1* | 1/2019 | Sadaghiani | G06N 3/08 |
| 10,255,429 | B2* | 4/2019 | Vancini | G06F 21/45 |
| 10,482,391 | B1* | 11/2019 | Lynch | G06Q 10/00 |
| 10,523,643 | B1* | 12/2019 | Davis | H04L 63/20 |
| 10,726,491 | B1* | 7/2020 | Hockey | G06F 16/24578 |
| 2003/0097330 | A1* | 5/2003 | Hillmer | G06Q 20/206 705/38 |
| 2003/0154406 | A1* | 8/2003 | Honarvar | G06Q 20/4014 726/10 |
| 2004/0103309 | A1* | 5/2004 | Tracy | G06F 21/577 726/25 |
| 2006/0041507 | A1* | 2/2006 | Novack | G06F 21/31 705/50 |
| 2006/0188076 | A1* | 8/2006 | Isenberg | H04M 3/385 379/88.02 |
| 2006/0282660 | A1* | 12/2006 | Varghese | G07F 7/1041 713/155 |
| 2009/0089869 | A1* | 4/2009 | Varghese | G06Q 20/4014 726/7 |
| 2010/0250398 | A1* | 9/2010 | Susilo | H04L 67/02 705/26.1 |
| 2010/0274678 | A1* | 10/2010 | Rolf | G06Q 20/3255 705/17 |
| 2012/0323752 | A1* | 12/2012 | Edvardson | G06Q 40/08 705/37 |
| 2015/0067804 | A1* | 3/2015 | Maxwell | H04L 61/2007 726/7 |
| 2015/0170148 | A1* | 6/2015 | Priebatsch | G06Q 20/4016 705/44 |
| 2015/0339664 | A1* | 11/2015 | Wong | H04L 63/0823 705/71 |
| 2016/0012427 | A1* | 1/2016 | Van Heerden | G06Q 20/384 705/44 |
| 2016/0117466 | A1* | 4/2016 | Singh | G06Q 50/265 702/19 |
| 2016/0364427 | A1* | 12/2016 | Wedgeworth, III | G06F 16/27 |
| 2016/0371540 | A1 | 12/2016 | Pabbichetty | |
| 2017/0078322 | A1* | 3/2017 | Seiver | H04L 41/12 |
| 2017/0163647 | A1* | 6/2017 | Cernoch | H04L 63/105 |
| 2017/0200228 | A1* | 7/2017 | Bryant | G06Q 40/04 |
| 2018/0069867 | A1 | 3/2018 | Grajek et al. | |
| 2018/0139606 | A1 | 5/2018 | Green et al. | |
| 2018/0219917 | A1* | 8/2018 | Chiang | G06F 21/45 |
| 2019/0197443 | A1* | 6/2019 | Anderson | H04L 63/06 |
| 2019/0207949 | A1* | 7/2019 | Parker | H04L 63/08 |
| 2019/0385175 | A1* | 12/2019 | Chamberlain | G06Q 30/0185 |
| 2020/0076813 | A1* | 3/2020 | Felice-Steele | G06F 21/604 |
| 2020/0334705 | A1* | 10/2020 | Benkreira | G06F 21/577 |

FOREIGN PATENT DOCUMENTS

| | | |
|---|---|---|
| CN | 103618604 | 3/2014 |
| CN | 104301117 | 1/2015 |
| CN | 104376237 | 2/2015 |
| CN | 104590091 | 4/2015 |
| CN | 105184881 | 12/2015 |
| CN | 106209787 | 12/2016 |
| CN | 106211153 | 12/2016 |
| CN | 106789851 | 5/2017 |
| CN | 107491675 | 12/2017 |
| CN | 107872433 | 4/2018 |
| CN | 109120605 | 1/2019 |
| TW | 201820194 | 6/2018 |
| TW | 201824108 | 7/2018 |
| WO | WO 2018007823 | 1/2018 |

OTHER PUBLICATIONS

International Search Report and Written Opinion in International Application No. PCT/CN2019/094848, dated Sep. 29, 2019, 9 pages (Partial English Translation).

Nakamoto, "Bitcoin: A Peer-to-Peer Electronic Cash System," www.bitcoin.org, 2005, 9 pages.

Extended European Search Report in European Application No. 19840521.9, dated Apr. 1, 2021, 8 pages.

* cited by examiner

IDENTITY VERIFICATION AND ACCOUNT INFORMATION UPDATING METHODS AND APPARATUSES

CROSS-REFERENCE TO RELATED APPLICATIONS

This application is a continuation of PCT Application No. PCT/CN2019/094848, filed on Jul. 5, 2019, which claims priority to Chinese Patent Application No. 201810845003.3, filed on Jul. 27, 2018, and each application is hereby incorporated by reference in its entirety.

TECHNICAL FIELD

The present specification relates to the field of risk control technologies, and in particular, to identity verification and account information updating methods and apparatuses.

BACKGROUND

In practice, identity verification usually needs to be performed on users. For example, when a user makes an account information update, account information is updated only after it is verified whether the current operator performing the account information updating operation is an account owner, so that no loss is caused to a user's account. Therefore, it is necessary to improve an identity verification method.

SUMMARY

On this basis, the present specification provides identity verification and account information updating methods and apparatuses.

According to a first aspect of the embodiments of the present specification, an identity verification method is provided, where the method includes the following: obtaining personal information and network environment information of a current operator after an account information updating request is received; separately performing risk identification on the personal information and the network environment information to correspondingly obtain a first risk identification result and a second risk identification result, where the first risk identification result is used to represent a risk that the current operator is inconsistent with an account owner, and the second risk identification result is used to represent a risk that security of a network environment in which the current operator is located is risky; and selecting an identity verification method based on the first risk identification result and the second risk identification result, and performing identity verification on the current operator based on the identity verification method.

Optionally, the step of performing risk identification on the network environment information includes the following: performing feature extraction on the network environment information; and inputting an extracted feature to a risk control model to perform risk identification on the network environment information.

Optionally, the personal information includes biological information of the current operator and account information of a to-be-updated account.

Optionally, the account information includes historical transaction information of the account, historical operation information of the account, and/or network identity information bound to the account.

Optionally, the step of performing risk identification on the personal information to obtain a first risk identification result includes the following: obtaining historical transaction information input by the current operator, and if the input historical transaction information is inconsistent with actual historical transaction information, determining that the first risk identification result is "risky"; and/or performing feature extraction on the historical operation information, and if a risky feature is extracted, determining that the first risk identification result is "risky"; and/or obtaining network identity information input by the current operator, and if the input network identity information is inconsistent with prestored network identity information, determining that the first risk identification result is "risky".

Optionally, the step of performing risk identification on the personal information to obtain a first risk identification result includes the following: obtaining the biological information of the current operator; and if the input biological information is inconsistent with prestored biological information, determining that the first risk identification result is "risky".

Optionally, the step of selecting an identity verification method based on the first risk identification result and the second risk identification result includes the following: calculating a first risk score based on a risk identification result corresponding to the account information in the first risk identification result; calculating a second risk score based on a risk identification result corresponding to the biological information in the first risk identification result; calculating a third risk score based on the second risk identification result; and selecting the identity verification method based on the first risk score, the second risk score, and the third risk score.

Optionally, the biological information includes iris information, fingerprint information, voiceprint information, and/or face feature information.

Optionally, the step of performing identity verification on the current operator based on the identity verification method includes the following: inputting the first risk identification result and the second risk identification result to a prestored machine learning model to obtain an identity verification result of the current operator, where the identity verification result is used to represent a probability that the current operator is the same as the account owner.

According to a second aspect of the embodiments of the present specification, an account information updating method is provided, where the method includes the following: performing identity verification on a current operator performing an account updating operation based on the identity verification method according to some embodiments; and updating account information if the identity verification succeeds.

According to a third aspect of the embodiments of the present specification, an identity verification apparatus is provided, where the apparatus includes the following: an acquisition unit, configured to obtain personal information and network environment information of a current operator after an account information updating request is received; a risk identification module, configured to separately perform risk identification on the personal information and the network environment information to correspondingly obtain a first risk identification result and a second risk identification result, where the first risk identification result is used to represent a risk that the current operator is inconsistent with an account owner, and the second risk identification result is used to represent a risk that security of a network environment in which the current operator is located is risky; and an identity verification module, configured to select an identity verification method based on the first risk identification result and the second risk identification result, and perform identity verification on the current operator based on the identity verification method.

According to a fourth aspect of the embodiments of the present specification, an account information updating apparatus is provided, where the apparatus includes the following: the identity verification apparatus according to some embodiments; and an information updating module, configured to update account information if an identity verification result of the identity verification apparatus is "successful".

According to a fifth aspect of the embodiments of the present specification, a computer-readable storage medium is provided, where the computer-readable storage medium stores a computer program, and a processor executes the program to perform the method according to some embodiments.

According to a sixth aspect of the embodiments of the present specification, a computer device is provided, where the computer device includes a memory, a processor, and a computer program that is stored in the memory and can run on the processor, and the processor executes the program to perform the method according to some embodiments.

According to the solutions in the embodiments of the present specification, the personal information and the network environment information of the current operator are obtained, so that the risk that the current operator is inconsistent with the account owner can be identified, and the risk that the security of the network environment in which the current operator is located is risky can be identified. The two risk identification results are used together as the basis for determining an identity of the current operator. As such, identification accuracy can be improved, an account theft risk can be reduced, and security can be improved. In addition, the previously described identification method is performed in real time, so that unnecessary operations of the user can be reduced.

It should be understood that the previous general description and the following detailed description are merely examples and explanations, and impose no limitation on the present specification.

BRIEF DESCRIPTION OF DRAWINGS

The accompanying drawings, which are incorporated in and constitute a part of the present specification, illustrate embodiments consistent with the present specification and, together with the description, serve to explain the principles of the present specification.

DESCRIPTION OF EMBODIMENTS

Example embodiments are described in detail here, and examples of the example embodiments are presented in the accompanying drawings. When the following description relates to the accompanying drawings, unless specified otherwise, the same numbers in different accompanying drawings represent same or similar elements. Embodiments described below do not represent all embodiments consistent with the present specification. On the contrary, the embodiments are only examples of apparatuses and methods that are described in the appended claims in detail and consistent with some aspects of the present specification.

The terms used in the present specification are merely for illustrating specific embodiments, and are not intended to limit the present specification. The terms "a" and "the" of singular forms used in the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present specification to describe various types of information, the information is not limited to the terms. These terms are only used to differentiate between information of the same type. For example, without departing from the scope of the present specification, first information can also be referred to as second information, and similarly, the second information can be referred to as the first information. Depending on the context, for example, the word "if" used here can be explained as "while", "when", or "in response to determining".

Figure 1:
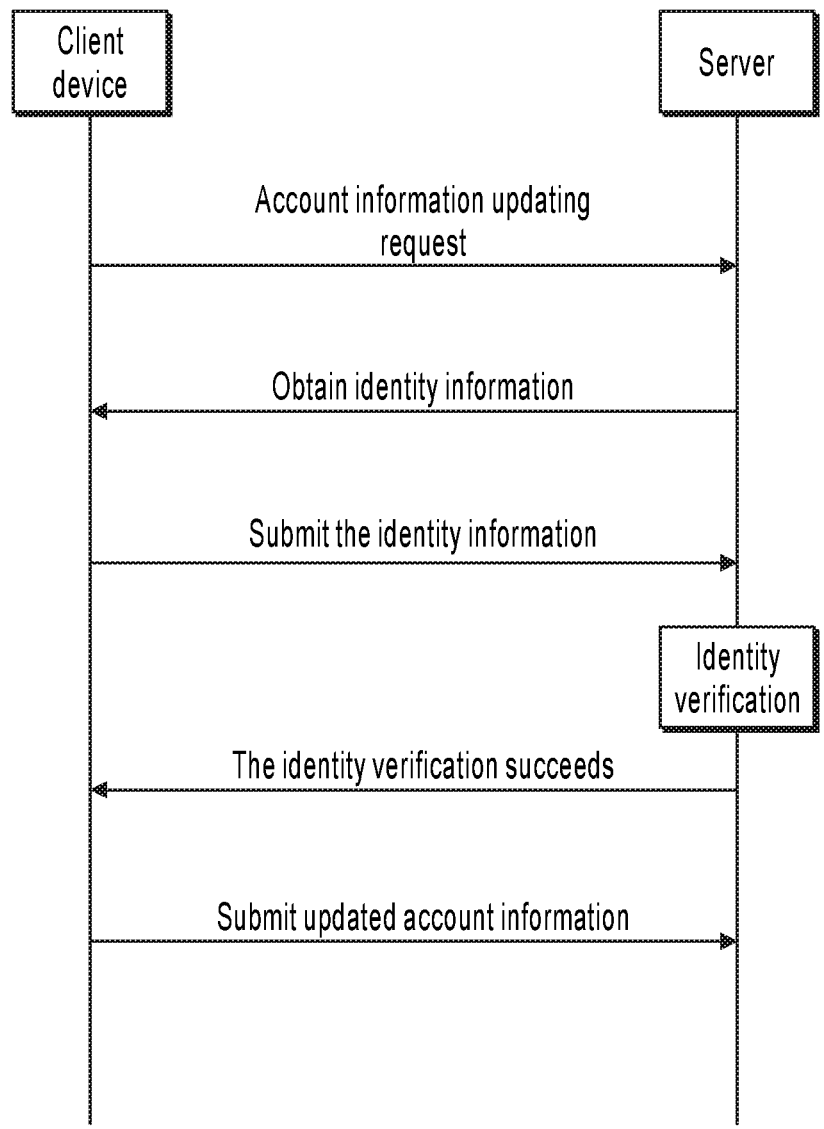
FIG. 1 is a flowchart illustrating identity verification, according to an embodiment.

FIG. 1 is a flowchart illustrating identity verification, according to an embodiment. The identity verification process can be triggered by a client device. For example, identity verification can be performed first when a user needs to perform an account information updating operation. The account information updating refers to operations of adding, deleting, and updating basic account information (e.g., a password, a bound mobile number, and an email address) by the user. After a server receives an account information updating request sent by the client device, the server can request the client device to provide identity information used to prove an identity of the current operator. The server can perform verification on the identity information after the client device submits the identity information. The client device is allowed to update account information if the verification succeeds. The client device can send updated account information to the server.

Figure 2:
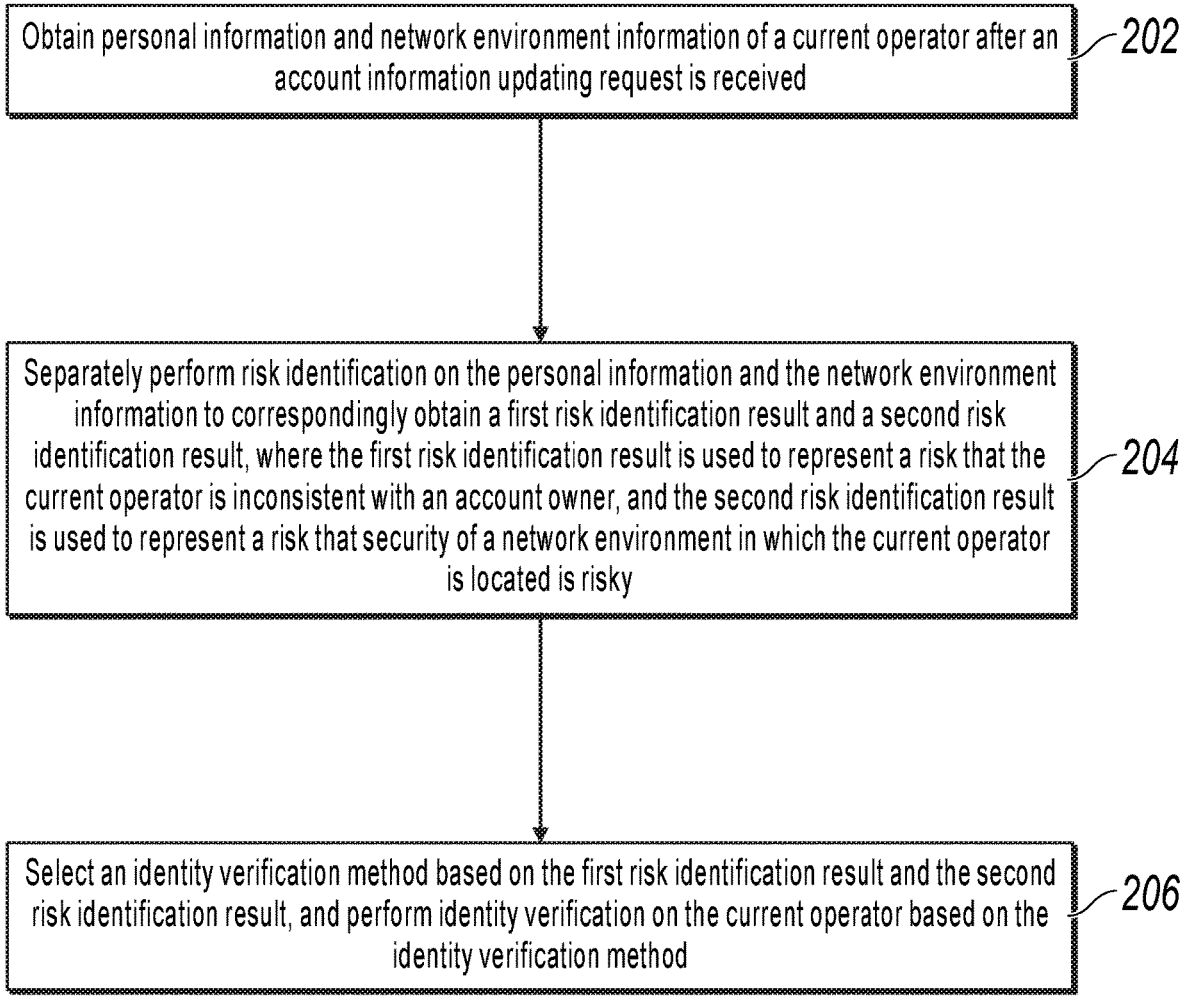
FIG. 2 is a flowchart illustrating an identity verification method, according to an embodiment of the present specification.

On this basis, embodiments of the present specification provide an identity verification method. As shown in FIG. 2, the method can include the following steps:

Step 202: Obtain personal information and network environment information of a current operator after an account information updating request is received.

Step 204: Separately perform risk identification on the personal information and the network environment information to correspondingly obtain a first risk identification result and a second risk identification result, where the first risk identification result is used to represent a risk that the current operator is inconsistent with an account owner, and the second risk identification result is used to represent a risk that security of a network environment in which the current operator is located is risky.

Step 206: Select an identity verification method based on the first risk identification result and the second risk identification result, and perform identity verification on the current operator based on the identity verification method.

Some embodiments can be performed by a server. In step 202, the current operator is a user who currently sends the account information updating request to the server. The personal information of the current operator can be used to determine an identity of the current operator, and the network environment information of the current operator can be used to represent the security of the network environment of the current operator.

In step 204, the first risk identification result and the second risk identification result can be represented by using Boolean values (1 or 0), where the value 1 can indicate that there is a risk, and the value 0 indicates that there is no risk. Or, the first risk identification result and the second risk identification result can be represented by using scores. For example, a score greater than 80 indicates that there is a high risk, a score greater than 60 and less than or equal to 80 indicates that there is a certain risk, a score greater than 40 and less than or equal to 60 indicates that a risk is relatively low, and a score less than 40 indicates that there is no risk.

In step 206, the identity verification method can be selected comprehensively based on the first risk identification result and the second risk identification result. For example, when both the first risk identification result and the second risk identification result are "no risk, a relatively simple verification method (e.g., sending an SMS verification code or an email verification code) is selected. When both the first risk identification result and the second risk identification result are "risky", a relatively complex or reliable verification method (e.g., manual verification) is used.

According to the solution in some embodiments of the present specification, the personal information and the network environment information of the current operator are obtained, so that the risk that the current operator is inconsistent with the account owner can be identified, and the risk that the security of the network environment in which the current operator is located is risky can be identified. The two risk identification results are used together as the basis for determining the identity of the current operator. As such, identification accuracy can be improved, an account theft risk can be reduced, and security can be improved. In addition, the previously described identification method is performed in real time, so that unnecessary operations of the user can be reduced.

In some embodiments, the personal information includes biological information of the current operator and account information of a to-be-updated account. The biological information is information that includes an inherent physiological feature of a person and is obtained by using a biometric identification technology, for example, fingerprint information, face feature information, iris information, and/or voiceprint information. The account information can include historical transaction information of the account, historical operation information of the account, and/or network identity information bound to the account. The historical transaction information can be information such as a time and an order address of the latest transaction. The historical operation information can be login information, logout information, etc. in a historical time period. The network identity information bound to the account can be an associated mobile number, an associated email address, a password protection question, etc. of the account. The account information can be used to determine whether an affiliation relationship between the operator and the current account is strong or weak, and the biological information can be further used to determine consistency between the operator and the account, so that determining accuracy is improved.

Therefore, risk identification can be performed on the personal information by using the following methods:

Method 1: If the account information includes the historical transaction information of the account, historical transaction information input by the current operator can be obtained. If the input historical transaction information is inconsistent with actual historical transaction information, it is determined that the first risk identification result is "risky". For example, it can be determined that the first risk identification result is "risky" if the order time of the latest transaction of the account recorded in a system database is Jul. 1, 2018 and the order address of the latest transaction is A, but in the historical transaction information provided by the current operator, the order address is B, which is inconsistent with the record in the database.

Method 2: If the account information includes the historical operation information of the account, feature extraction can be performed on the historical operation information, and if a risky feature is extracted, it is determined that the first risk identification result is "risky". Features can include the number of occurrences, timepoints of occurrences, places of occurrences, and durations of various operations (e.g., logging in, logging out, and using an account asset). The risky feature is a feature that is contrary to an operation habit of the user in a general situation. For example, the user logs in to the account multiple times by using different IP addresses in a short period of time, or hundreds of transactions are performed for the account in a short period of time (e.g., in one day). If a risky feature is extracted, it indicates that the account is likely to be hacked.

Method 3: If the account information includes the network identity information bound to the account, network identity information input by the current operator can be obtained. If the input network identity information is inconsistent with prestored network identity information, it is determined that the first risk identification result is "risky". The network identity information can include an account name, an account nickname, an email address, a password and password protection question and answer related to them, etc. An account authenticated by real name can further include personal identity information bound to the account, for example, an ID card, a passport number, or a driving license number.

When the account information includes multiple pieces of the previous information, a corresponding risk identification method can be a combination of the three methods previously described. For example, if the account information includes the historical transaction information and the network identity information, both Method 1 and Method 3 can be used to perform risk identification.

In addition, in an embodiment in which the personal information includes the biological information, when risk identification is being performed on the personal information, the biological information of the current operator can be obtained. If the input biological information is inconsistent with prestored biological information, it is determined that the first risk identification result is "risky". A corresponding module on a user terminal device can be invoked through a client device (e.g., a mobile phone), and then upload the obtained biological information to the server. For example, when the face feature information needs to be obtained, the client device can invoke a mobile phone camera to perform photographing, and upload a face photo of the user to the server after photographing is completed. Alternatively, the client device can extract a feature, and then return the extracted feature information to the server.

In some embodiments, the step of performing risk identification on the network environment information includes the following: performing feature extraction on the network environment information; and inputting an extracted feature to a risk control model to perform risk identification on the network environment information. The extracted feature can include network type information used to indicate whether a network is a public network or a home network and/or information used to indicate whether a network IP address has been reported, etc. The extracted feature can be input to a pre-trained risk control model (e.g., a binary model), and an output result of the risk control model is used as a result of performing risk identification on the network environment information.

In some embodiments, during selection of an identity verification method based on the first risk identification result and the second risk identification result, a first risk score can be calculated based on a risk identification result corresponding to the account information in the first risk identification result; a second risk score can be calculated based on a risk identification result corresponding to the biological information in the first risk identification result; a third risk score can be calculated based on the second risk identification result; and the identity verification method can be selected based on the first risk score, the second risk score, and the third risk score.

The level of the risk score can be used to represent a risk of performing the account information updating operation. The higher the score, the greater the risk is. In an embodiment in which the personal information includes the biological information and the account information, the first risk score and the second risk score can be obtained, and the identity verification method can be selected with reference to the third risk score. Specifically, the identity verification method can be selected based on a weighted average value of the risk scores, or another algorithm or model can be used for comprehensive assessment, to finally select the identity verification method. In an embodiment in which the personal information includes only the biological information or the account information, only the first risk score or the second risk score can be obtained, and then the identity verification method can be selected with reference to the third risk score.

The previously described identity verification method can be an identity verification policy, for example, manual verification, or verification using an email verification code or an SMS verification code. Alternatively, verification can be performed by using a machine learning model. For the latter, the first risk identification result and the second risk identification result can be input to a prestored machine learning model to obtain an identity verification result of the current operator. The identity verification result is used to represent a probability that the current operator is the same as the account owner.

In some embodiments, multiple available verification methods can be sent to the user, and the user can select one of them. It is considered that the identity of the current operator is verified if one of the verification methods succeeds. As such, autonomy of the user can be improved, thereby improving user experience.

Figure 3:
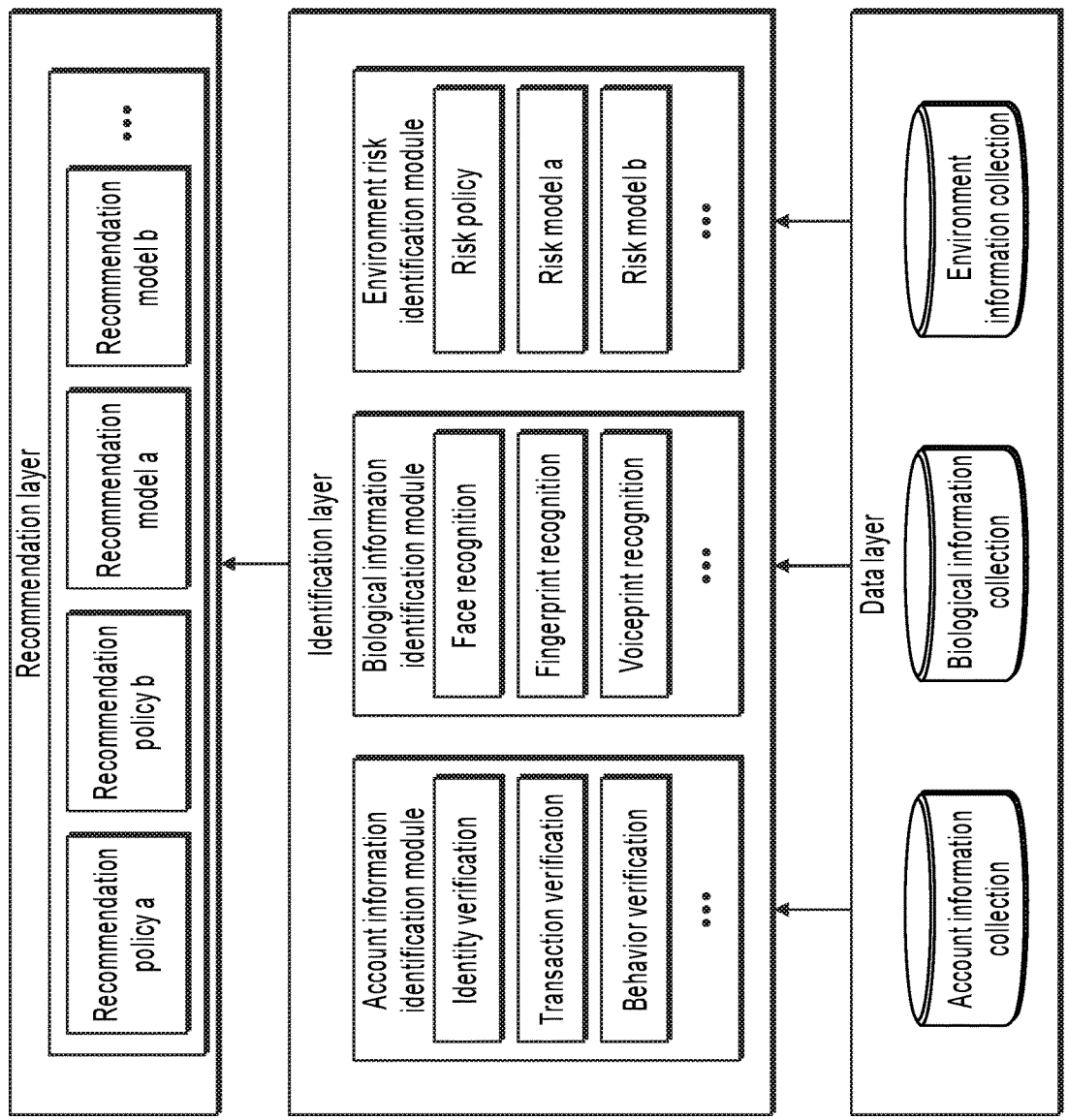
FIG. 3 is a hierarchical architectural diagram illustrating an identity verification system, according to an embodiment of the present specification.

The previously described identity verification method can be implemented by using an identity verification system shown in FIG. 3. The system can include a data layer, an identification layer, and a recommendation layer. The data layer can include an account information collection unit, a biological information collection unit, and an environment information collection unit, which are respectively configured to collect account information and biological information and network environment information of a current operator. The identification layer can include an account information identification module, a biological information identification module, and an environment risk identification module. The account information identification module can obtain data sent by the account information collection module, and perform risk identification through identity verification, transaction verification, and/or behavior verification. The biological information identification module can obtain data sent by the biological information collection unit, and perform biometric identification such as face recognition, fingerprint recognition, and/or voiceprint recognition. The environment risk identification module can obtain data sent by the environment information collection module, and perform risk identification based on a prestored risk policy or risk model. The recommendation layer collects data sent by the identification layer, analyzes the data by using various recommendation policies and recommendation models of the layer, and then presents different verification methods to a user. Therefore, personalized verification methods can be sent to the user, which more adapts to actual situations and also improves the difficulty in avoiding a risk by a malicious user, so that system defense robustness is improved.

Figure 4:
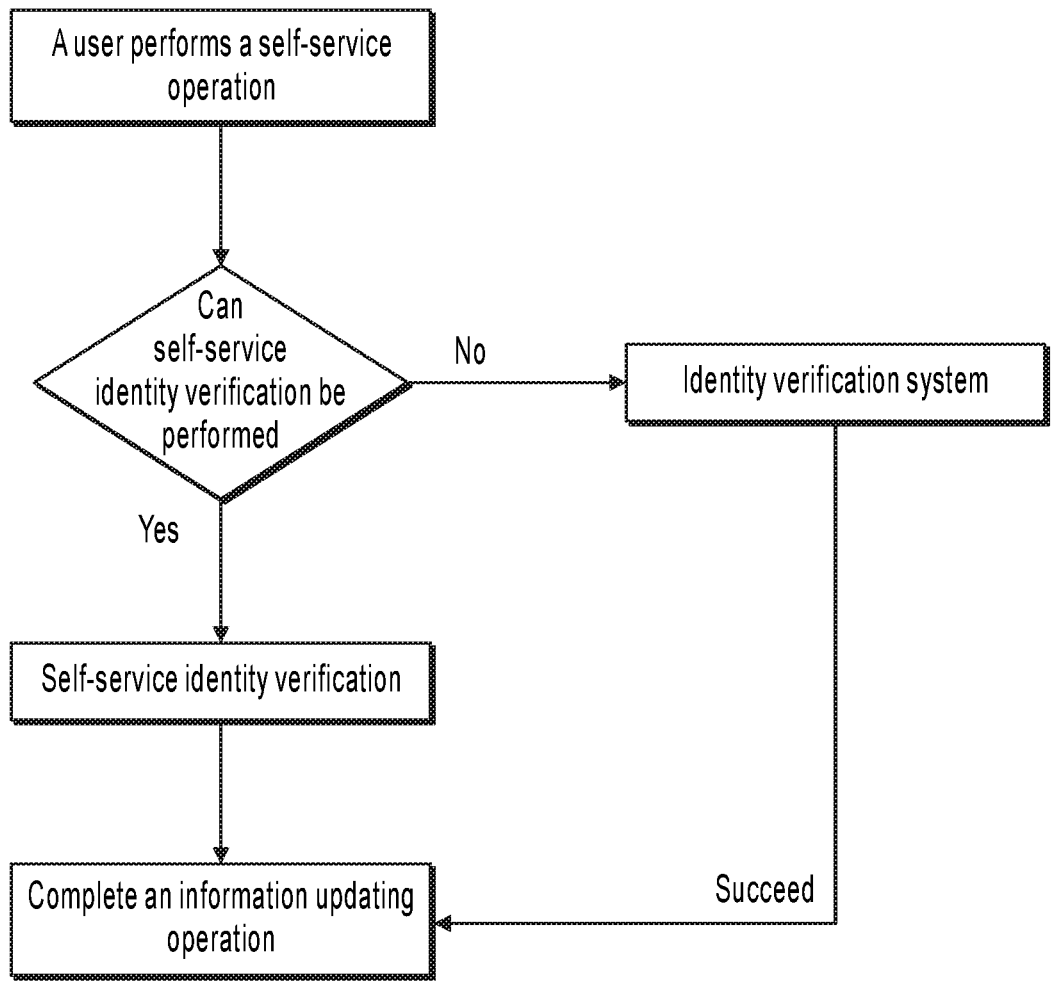
FIG. 4 is an overall flowchart illustrating an identity verification method, according to an embodiment of the present specification.

In some embodiments, as shown in FIG. 4, a user can first perform an operation by using a common self-service identity verification method. If the self-service identity verification can be performed, identity verification is performed by using the common self-service identity verification method. If the self-service identity verification cannot be performed (e.g., a verification code cannot be obtained, or a mobile phone or a mailbox cannot be used), identity verification can be performed by using the identity verification system shown in FIG. 3. An account information updating operation can be completed if the verification succeeds. In some embodiments, the following problem is alleviated: In a conventional identity verification method, when a user cannot perform self-service identity verification, identity verification needs to be performed by using background manual verification method, which causes poor timeliness.

The solution in some embodiments of the present specification has the following advantages:

(1) A current operator is verified by using biometric identification and intelligent risk policies, and gradient personalized verification methods are output. This can not only increase a self-service operation success rate of the user and reduce unnecessary incoming calls of the user but also reduce a theft risk. In addition, compared with other solutions depending only on interaction services using faces and certificates, the solution substantially improves experience and also improves system defense robustness.

(2) The innovative service method combining biometric identification, account information verification, online environment risk identification, and intelligent recommendation can be used to identify an operator more accurately and effectively, thereby improving user operation experience while preventing the theft.

(3) A system that alleviates problems for a user altogether is provided to replace a system in which manual service-based processing is needed and processing duration is not fixed. In terms of user operations, verification can be completed through only three steps. This greatly reduces the original processing duration of one to seven workdays, thereby improving user operation experience while ensuring user security in multiple dimensions.

Figure 5:
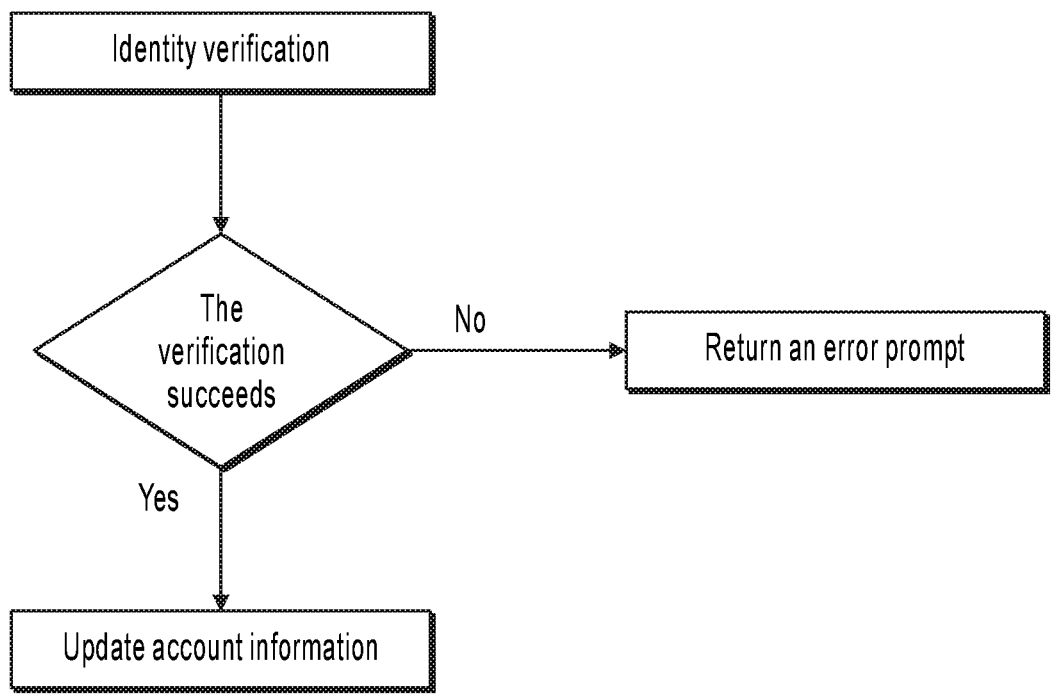
FIG. 5 is a flowchart illustrating an account information updating method, according to an embodiment of the present specification.

As shown in FIG. 5, an embodiment of the present specification further provides an account information updating method. The method includes the following: performing identity verification on a current operator based on the identity verification method according to some embodiments; and updating account information if the identity verification succeeds. Further, an error prompt can be returned to a client device if the identity verification fails.

Figure 6:
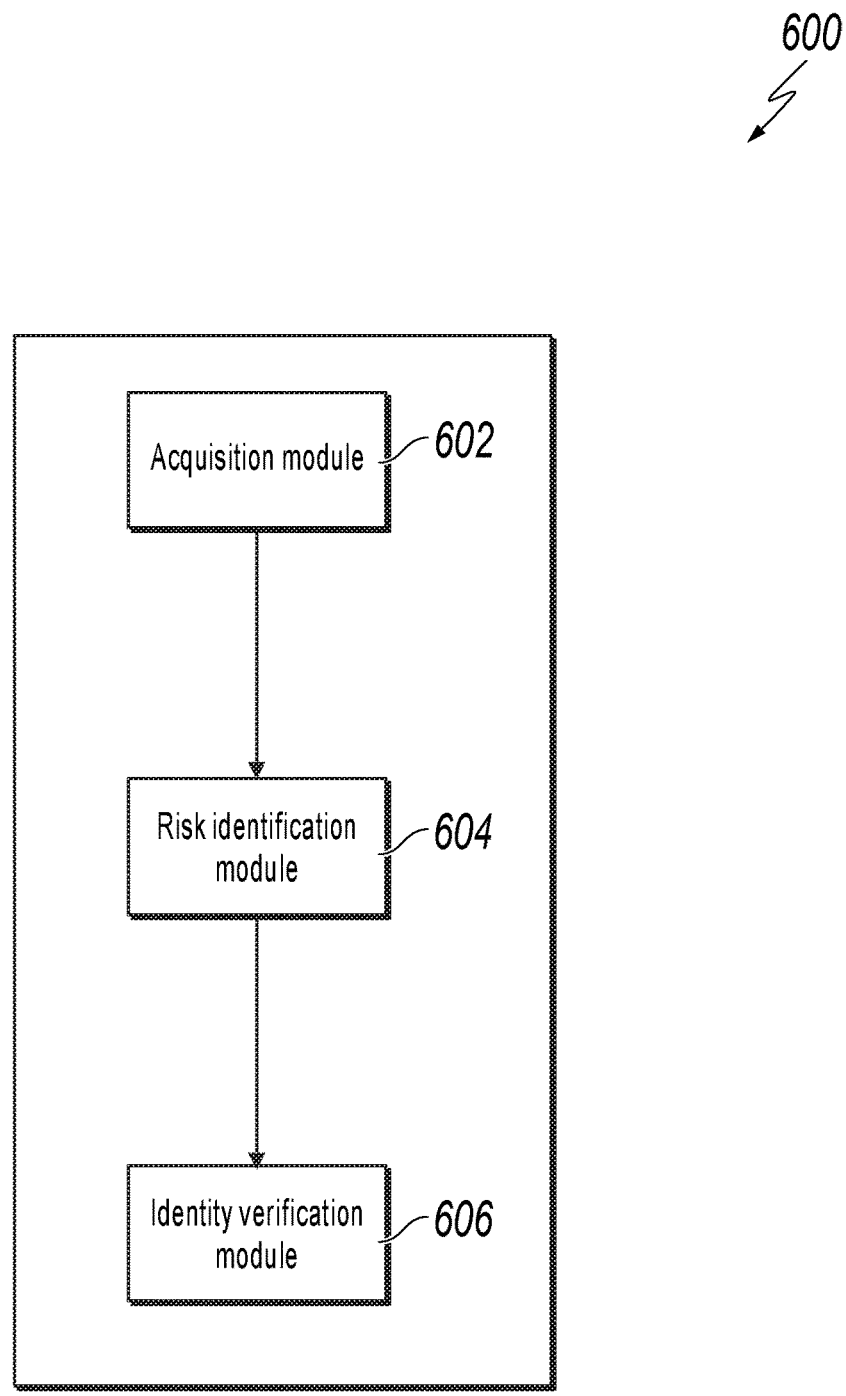
FIG. 6 is a block diagram illustrating an identity verification apparatus, according to an embodiment of the present specification.

As shown in FIG. 6, an embodiment of the present specification further provides an identity verification apparatus 600, and the apparatus can include the following: an acquisition unit 602, configured to obtain personal information and network environment information of a current operator after an account information updating request is received; a risk identification module 604, configured to separately perform risk identification on the personal information and the network environment information to correspondingly obtain a first risk identification result and a second risk identification result, where the first risk identification result is used to represent a risk that the current operator is inconsistent with an account owner, and the second risk identification result is used to represent a risk that security of a network environment in which the current operator is located is risky; and an identity verification module 606, configured to select an identity verification method based on the first risk identification result and the second risk identification result, and perform identity verification on the current operator based on the identity verification method.

For an embodiment process of functions and roles of each module in the apparatus, references can be made to an embodiment process of a corresponding step in the previously described identity verification method. Details are omitted here for simplicity.

Figure 7:
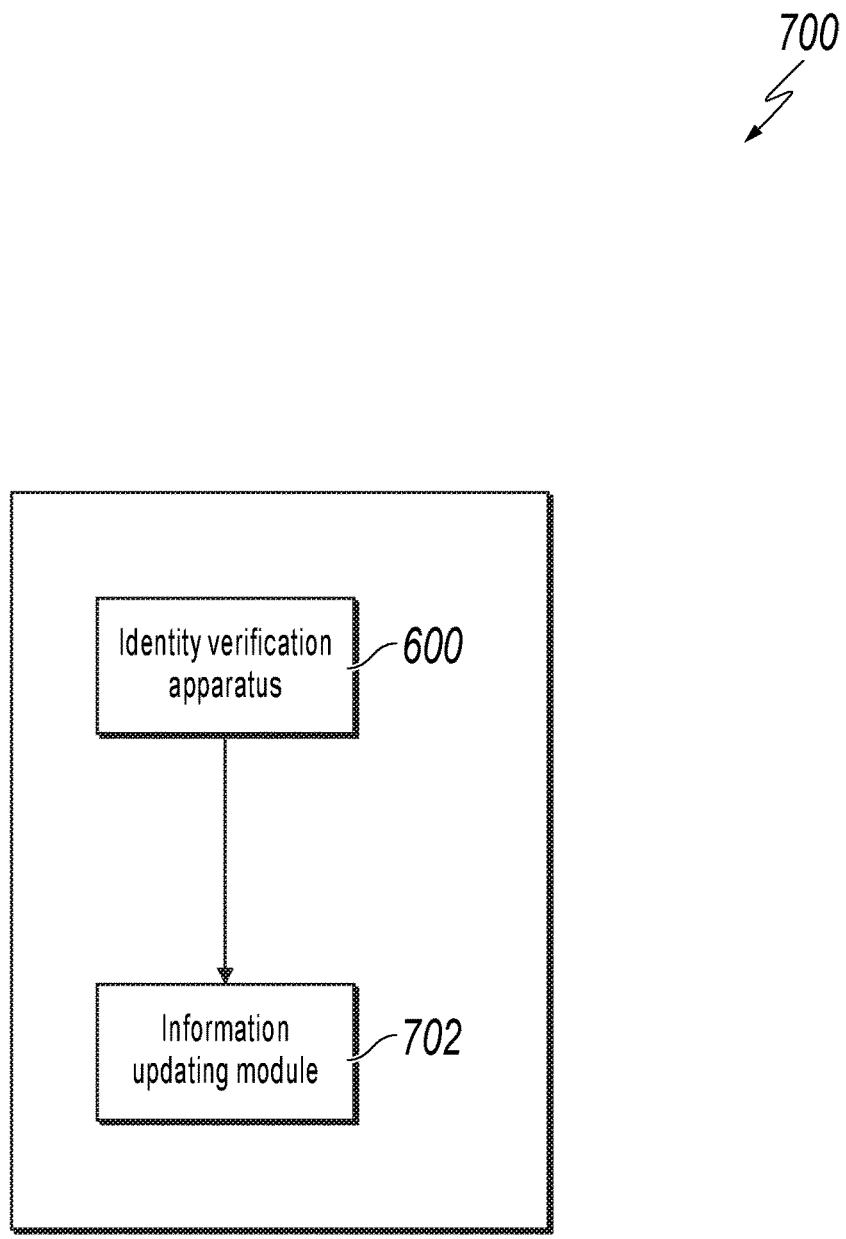
FIG. 7 is a block diagram illustrating an account information updating apparatus, according to an embodiment of the present specification.

As shown in FIG. 7, an embodiment of the present specification further provides an account information updating apparatus 700, and the apparatus can include the following: the identity verification apparatus 600 in any one of the embodiments; and an information updating module 702, configured to update account information if identity verification succeeds.

For an embodiment process of functions and roles of the information updating module 702 in the apparatus, references can be made to an embodiment process of a corresponding step in the previously described account information updating method. Details are omitted here for simplicity.

Figure 8:
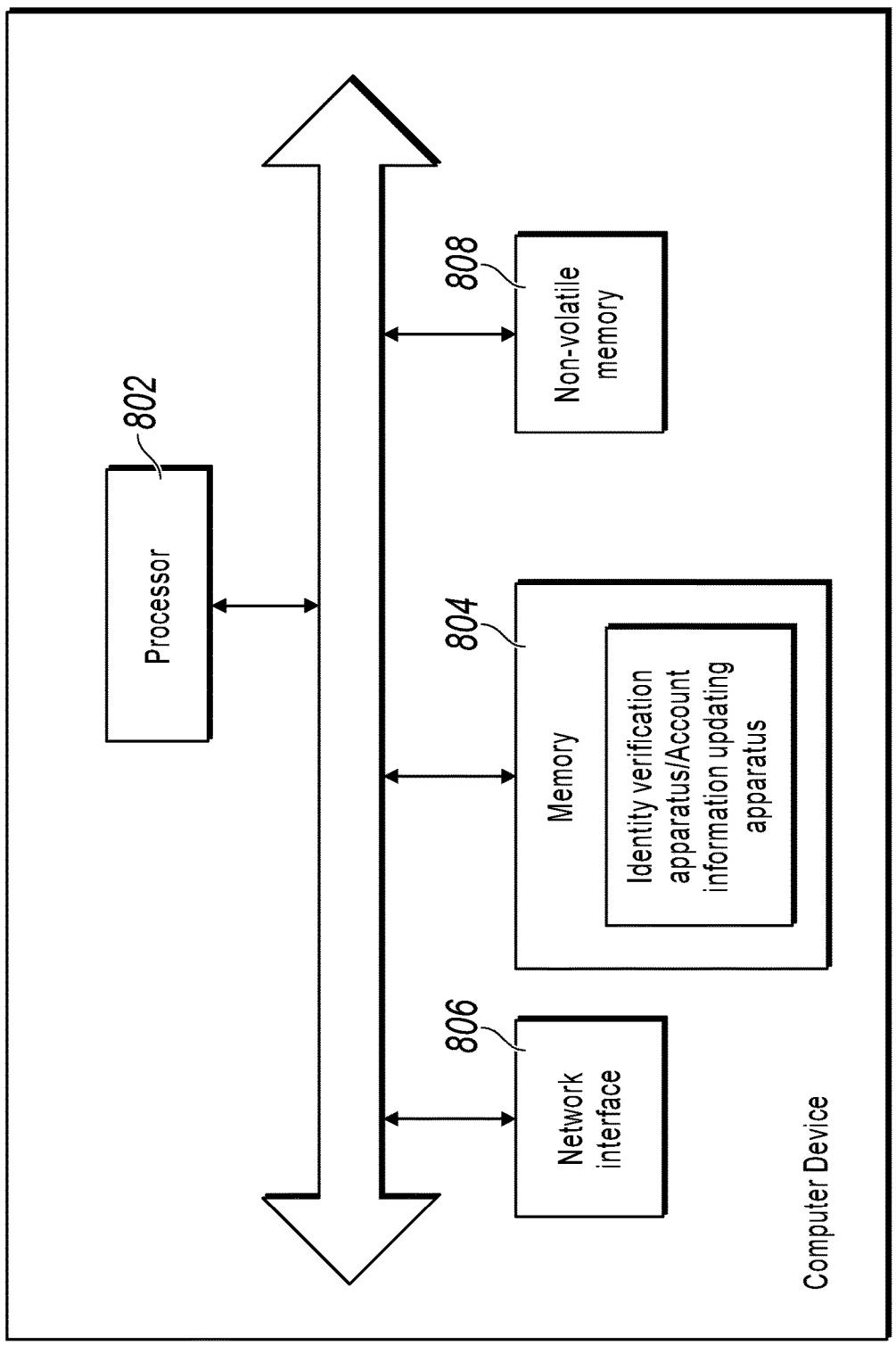
FIG. 8 is a schematic diagram illustrating a computer device used to perform the method in the embodiments of the present specification, according to an embodiment of the present specification.

The apparatus embodiments of the present specification can be applied to a computer device, for example, a server or a terminal device. The apparatus embodiments can be implemented by software, hardware, or a combination of hardware and software. Software embodiment is used as an example. As a logical apparatus, the apparatus is formed by reading a corresponding computer program instruction in a non-volatile memory to a memory by a processor processing files of the apparatus. In terms of hardware, FIG. 8 is a hardware structural diagram illustrating a computer device where the apparatus in the present specification is located. In addition to a processor 802, a memory 804, a network interface 806, and a non-volatile memory 808 shown in FIG. 8, the server or electronic device where the apparatus in the embodiments is located can usually include other hardware based on actual functions of the computer device. Details are omitted here for simplicity.

Because apparatus embodiments basically correspond to method embodiments, for related parts, references can be made to related descriptions in the method embodiments. The previously described apparatus embodiments are merely examples. The modules described as separate parts can be or does not have to be physically separate, and parts displayed as modules can be or does not have to be physical modules, and can be located in one position, or can be distributed on a plurality of network modules. Some or all of the modules can be selected based on actual needs to achieve the objectives of the solutions of the present specification. A person of ordinary skill in the art can understand and implement the embodiments of the present specification without creative efforts.

Correspondingly, an embodiment of the present specification further provides a computer storage medium. The storage medium stores a program, and a processor executes the program to perform the method according to any one of the embodiments.

Correspondingly, an embodiment of the present application further provides a computer device. The computer device includes a memory, a processor, and a computer program that is stored in the memory and can run on the processor, and the processor executes the program to perform the method according to any one of the embodiments.

The embodiments of the present specification can use a form of a computer program product that is implemented on one or more storage media (including but not limited to a disk memory, a CD-ROM, an optical memory, etc.) that include program code. The computer-usable readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device.

A person skilled in the art can easily figure out another embodiment of the present specification after thinking over the present specification and practicing the present specification disclosed here. The present disclosure is intended to cover any variations, uses, or adaptations of the present disclosure, and these variations, uses, or adaptations follow the general principles of the present disclosure and include common knowledge or conventional techniques that are not disclosed in the technical field of the present disclosure. The present specification and the embodiments are merely considered as examples, and the actual scope and the spirit of the present disclosure are pointed out by the following claims.

It should be understood that the present disclosure is not limited to the precise structures that have been described above and shown in the drawings, and various modifications and changes can be made without departing from the scope of the present disclosure. The scope of the present disclosure is limited by the appended claims only.

The previous descriptions are merely preferred embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A computer-implemented method for identity verification, comprising:
   receiving, from a client device, a request for updating an account;
   in response to receiving the request, obtaining, by a server from the client device, personal information of a user of the client device and information of a network environment associated with the client device, wherein the personal information comprises biometric information and account information of the user;
   performing, by the server, risk identification of the personal information to obtain a first risk identification result, wherein the first risk identification result identifies security risks associated with inconsistencies between the user and an owner of the account;
   performing, by the server, risk identification of the information of the network environment to obtain a second risk identification result, wherein the second risk identification result identifies security risks associated with the network environment;
   calculating, by the server, a first risk score based on the account information;
   calculating, by the server, a second risk score based on the biometric information;
   calculating, by the server, a third risk score based on the second risk identification result selecting, by the server, an identity verification method based on the first risk score, the second risk score, and the third risk score; and
   performing, by the server, identity verification of the user based on the identity verification method.

2. The computer-implemented method according to claim 1, wherein performing risk identification of the information of the network environment comprises:
   performing feature extraction to extract at least one feature from the information of the network environment; and
   inputting the at least one feature to a risk control model to perform the risk identification of the information of the network environment.

3. The computer-implemented method according to claim 1, wherein the account information comprises at least one of historical transaction information of the account, historical operation information of the account, or network identity information associated with the account.

4. The computer-implemented method according to claim 3, wherein performing risk identification of the personal information to obtain the first risk identification result comprises performing risk identification of the personal information to obtain the first risk identification result in response to determining that the account information is inconsistent with prestored account information.

5. The computer-implemented method according to claim 1, further comprising:

determining the first risk identification result as risky in response to determining that the biometric information is inconsistent with prestored biometric information.

6. The computer-implemented method according to claim 1, wherein the biometric information comprises one or more of iris information, fingerprint information, voiceprint information, or facial feature information.

7. The computer-implemented method according to claim 1, wherein performing identity verification of the user based on the identity verification method comprises:
   inputting the first risk identification result and the second risk identification result to a prestored machine learning model to obtain an identity verification result of the user, wherein the identity verification result identifies a probability that the user is an owner of the account.

8. The computer-implemented method of claim 1, further comprising:
   in response to determining that the identity verification of the user is successful, updating the account based on the request.

9. A non-transitory, computer-readable medium storing one or more instructions executable by a computer system to perform operations comprising:
   receiving, from a client device, a request for updating an account;
   in response to receiving the request, obtaining, from the client device, personal information of a user of the client device and information of a network environment associated with the client device, wherein the personal information comprises biometric information and account information of the user;
   performing risk identification of the personal information to obtain a first risk identification result, wherein the first risk identification result identifies security risks associated with inconsistencies between the user and an owner of the account;
   performing risk identification of the information of the network environment to obtain a second risk identification result, wherein the second risk identification result identifies security risks associated with the network environment;
   calculating a first risk score based on the account information;
   calculating a second risk score based on the biometric information;
   calculating a third risk score based on the second risk identification result
   selecting an identity verification method based on the first risk score, the second risk score, and the third risk score; and
   performing identity verification of the user based on the identity verification method.

10. The non-transitory, computer-readable medium according to claim 9, wherein performing risk identification of the information of the network environment comprises:
    performing feature extraction to extract at least one feature from the information of the network environment; and
    inputting the at least one feature to a risk control model to perform the risk identification of the information of the network environment.

11. The non-transitory, computer-readable medium according to claim 9, wherein the account information comprises at least one of historical transaction information of the account, historical operation information of the account, or network identity information associated with the account.

12. The non-transitory, computer-readable medium according to claim 11, wherein performing risk identification of the personal information to obtain the first risk identification result comprises performing risk identification of the personal information to obtain the first risk identification result in response to determining that the account information is inconsistent with prestored account information.

13. The non-transitory, computer-readable medium according to claim 9, further comprising:
determining the first risk identification result as risky in response to determining that the biometric information is inconsistent with prestored biometric information.

14. The non-transitory, computer-readable medium according to claim 9, wherein the biometric information comprises one or more of iris information, fingerprint information, voiceprint information, or facial feature information.

15. The non-transitory, computer-readable medium according to claim 9, wherein performing identity verification of the user based on the identity verification method comprises:
inputting the first risk identification result and the second risk identification result to a prestored machine learning model to obtain an identity verification result of the user, wherein the identity verification result identifies a probability that the user is an owner of the account.

16. The non-transitory, computer-readable medium of claim 9, further comprising:
in response to determining that the identity verification of the user is successful, updating the account based on the request.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, from a client device, a request for updating an account;
in response to receiving the request, obtaining, from the client device, personal information of a user of the client device and information of a network environment associated with the client device, wherein the personal information comprises biometric information and account information of the user;
performing risk identification of the personal information to obtain a first risk identification result, wherein the first risk identification result identifies security risks associated with inconsistencies between the user and an owner of the account;
performing risk identification of the information of the network environment to obtain a second risk identification result, wherein the second risk identification result identifies security risks associated with the network environment;
calculating a first risk score based on the account information;
calculating a second risk score based on the biometric information;
calculating a third risk score based on the second risk identification result
selecting an identity verification method based on the first risk score, the second risk score, and the third risk score; and
performing identity verification of the user based on the identity verification method.

18. The computer-implemented system according to claim 17, wherein performing risk identification of the information of the network environment comprises:
performing feature extraction to extract at least one feature from the information of the network environment; and
inputting the at least one feature to a risk control model to perform the risk identification of the information of the network environment.

19. The computer-implemented system according to claim 17, wherein the account information comprises at least one of historical transaction information of the account, historical operation information of the account, or network identity information associated with the account.

20. The computer-implemented system according to claim 19, wherein performing risk identification of the personal information to obtain the first risk identification result comprises performing risk identification of the personal information to obtain the first risk identification result in response to determining that the account information is inconsistent with prestored account information.

21. The computer-implemented system according to claim 17, further comprising:
determining the first risk identification result as risky in response to determining that the biometric information is inconsistent with prestored biometric information.

22. The computer-implemented system according to claim 17, wherein the biometric information comprises one or more of iris information, fingerprint information, voiceprint information, or facial feature information.

23. The computer-implemented system according to claim 17, wherein performing identity verification of the user based on the identity verification method comprises:
inputting the first risk identification result and the second risk identification result to a prestored machine learning model to obtain an identity verification result of the user, wherein the identity verification result identifies a probability that the user is an owner of the account.

24. The computer-implemented system of claim 17, further comprising:
in response to determining that the identity verification of the user is successful, updating the account based on the request.

* * * * *